United States Patent
Choi et al.

(10) Patent No.: US 10,031,280 B2
(45) Date of Patent: Jul. 24, 2018

(54) DISPLAY DEVICE

(71) Applicant: SAMSUNG DISPLAY CO., LTD., Yongin-si (KR)

(72) Inventors: Seongsik Choi, Seoul (KR); Cheuljin Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 131 days.

(21) Appl. No.: 15/048,727

(22) Filed: Feb. 19, 2016

(65) Prior Publication Data

US 2016/0363722 A1 Dec. 15, 2016

(30) Foreign Application Priority Data

Jun. 15, 2015 (KR) .................. 10-2015-0084124

(51) Int. Cl.
*F21V 8/00* (2006.01)

(52) U.S. Cl.
CPC .................. *G02B 6/0091* (2013.01)

(58) Field of Classification Search
USPC ........................................................ 362/611
See application file for complete search history.

(56) References Cited

U.S. PATENT DOCUMENTS

| 2008/0117577 A1 | 5/2008 | Kang et al. | |
| 2012/0257414 A1* | 10/2012 | Park | G02B 6/0068 362/611 |
| 2013/0208510 A1* | 8/2013 | Takashima | G09F 13/04 362/615 |
| 2014/0362325 A1 | 12/2014 | Lee et al. | |
| 2015/0219835 A1* | 8/2015 | Kim | G02B 6/0086 362/609 |
| 2015/0301266 A1* | 10/2015 | Araki | G02B 6/005 349/65 |

FOREIGN PATENT DOCUMENTS

| KR | 1020080045380 | 5/2008 |
| KR | 1020120057405 | 6/2012 |
| KR | 1020120123921 | 11/2012 |
| KR | 1020140142919 | 12/2014 |

* cited by examiner

*Primary Examiner* — Michael G Lee
*Assistant Examiner* — David Tardif
(74) *Attorney, Agent, or Firm* — Cantor Colburn LLP

(57) ABSTRACT

A display device includes: a lower frame having a planar shape, where a first groove is defined in an edge of the lower frame; a first intermediate frame coupled to the lower frame to define an accommodating space, where the first intermediate frame includes a side wall portion on an edge of the lower frame; a first adhesive member on the first groove, where the first adhesive member fixes the first intermediate frame to the lower frame; a second intermediate frame on the first intermediate frame; a display panel on an upper surface of the second intermediate frame; and a second adhesive member on the upper surface of the second intermediate frame, where the second adhesive member fixes the display panel to the second intermediate frame.

20 Claims, 6 Drawing Sheets

DISPLAY DEVICE

This application claims priority to Korean Patent Application No. 10-2015-0084124, filed on Jun. 15, 2015, and all the benefits accruing therefrom under 35 U.S.C. § 119, the content of which in its entirety is herein incorporated by reference.

BACKGROUND

1. Field

Embodiments of the invention relate to a display device, and more particularly, to a display device with a relatively simple assembly process of a backlight assembly.

2. Description of the Related Art

A liquid crystal display ("LCD") device is one of the most widely used types of flat panel display ("FPD") device. An LCD device typically includes two substrates with electrodes disposed thereon and a liquid crystal layer interposed between the two substrates. In such an LCD device, liquid crystal molecules of the liquid crystal layer are rearranged by voltages that are applied to the two electrodes, thereby adjusting the amount of transmitted light and displaying an image on the LCD device.

An LCD device, which is a passive-matrix light emitting device, includes a display panel for displaying an image and a backlight assembly for providing light to the display panel. A lower frame maintaining a framework of the backlight assembly accommodates various components such as, for example, an intermediate frame supporting the display panel, a fixing frame for fixing a light source, a light guide plate, and the like.

Recently, demand for a slimmed-down and lightweight LCD device has been increased in the market. Accordingly, research is being conducted on reducing a size of an overall circumferential area of an LCD device by reducing a bezel which corresponds to a width between an outer circumference of the LCD device and an active area in which an image is actually displayed. Further, for the slimming of the LCD device, the shape of the lower frame is undergoing various modifications. However, with such various modifications being made to the shape of the lower frame to achieve slimness of the LCD device and a narrow bezel, an assembly process of the LCD device may be complicated and manufacturing costs of the lower frame may rise.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the invention are directed to a display device that is slimmed-down and lightweight and is simplified in an assembly process.

According to an exemplary embodiment of the invention, a display device includes: a lower frame having a planar shape, where a first groove is defined in an edge of the lower frame; a first intermediate frame coupled to the lower frame to define an accommodating space, where the first intermediate frame includes a side wall portion on an edge of the lower frame; a first adhesive member on the first groove, where the first adhesive member fixes the first intermediate frame to the lower frame; a second intermediate frame on the first intermediate frame; a display panel on an upper surface of the second intermediate frame; and a second adhesive member on the upper surface of the second intermediate frame, where the second adhesive member fixes the display panel to the second intermediate frame.

In an exemplary embodiment, the first adhesive member and the second adhesive member may be liquid adhesives.

In an exemplary embodiment, a second groove may be defined on the upper surface of the second intermediate frame.

In an exemplary embodiment, the second adhesive member may be disposed in the second groove.

In an exemplary embodiment, the display device may further include a third adhesive member between the first intermediate frame and the second intermediate frame.

In an exemplary embodiment, the display device may further include: a light source unit which provides light to the display panel; a light guide plate which guides the light provided from the light source unit to the display panel; and a fixing frame at a side of the lower frame, where the fixing frame defines the accommodating space, along with the first intermediate frame.

In an exemplary embodiment, the first intermediate frame and the fixing frame may surround the light guide plate.

In an exemplary embodiment, the second intermediate frame may be between the side wall portion of the first intermediate frame and the light guide plate.

In an exemplary embodiment, the light source unit may be between the fixing frame and the light guide plate.

In an exemplary embodiment, the display device may further include a fourth adhesive member between the fixing frame and the lower frame, where the fourth adhesive member fixes the fixing frame to the lower frame.

In an exemplary embodiment, the display device may further include a third intermediate frame which covers the light source and an upper surface of the fixing frame and is coupled to the fixing frame, where the third intermediate frame includes: a first mold which covers the light source unit and the upper surface of the fixing frame; and a second mold bent from the first mold to cover a side surface of the fixing frame.

In an exemplary embodiment, a portion of the first mold may be disposed between the light guide plate and the display panel.

In an exemplary embodiment, the display device may further include a fifth adhesive member between the display panel and the first mold.

In an exemplary embodiment, the display device may further include a fastening member which fixes the first intermediate frame and the second intermediate frame to the lower frame.

According to another exemplary embodiment of the invention, a display device includes: a lower frame having a planar shape, where a first groove is defined in an edge of the lower frame; a first intermediate frame coupled to the lower frame to define an accommodating space, where the first intermediate frame includes a side wall portion on an edge of the lower frame and has a curvature; a first adhesive member on the first groove, where the first adhesive member fixes the first intermediate frame to the lower frame; a second intermediate frame on the first intermediate frame, where the second intermediate frame has a curvature; a display panel on an upper surface of the second intermediate frame, where the display panel has a curvature; and a second adhesive member on the upper surface of the second intermediate frame, where the second adhesive member fixes the display panel to the second intermediate frame.

In an exemplary embodiment, the first adhesive member and the second adhesive member may be liquid adhesives.

In an exemplary embodiment, a second groove may be defined on the upper surface of the second intermediate frame, and the second adhesive member may be disposed in the second groove.

In an exemplary embodiment, the display device may further include: a light source unit which provides light to the display panel; a light guide plate which guides the light provided from the light source unit to the display panel; and a fixing frame at a side of the lower frame, where the fixing frame defines the accommodating space, along with the first intermediate frame.

In an exemplary embodiment, the first intermediate frame and the fixing frame may surround the light guide plate.

In an exemplary embodiment, the display device may further include a third intermediate frame which covers the light source and an upper surface of the fixing frame and is coupled to the fixing frame, where the third intermediate frame includes: a first mold which covers the light source unit and the upper surface of the fixing frame; and a second mold bent from the first mold to cover a side surface of the fixing frame.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the disclosure of invention will be more clearly understood from the following detailed description taken in conjunction with the accompanying drawings, in which.

DETAILED DESCRIPTION

Figure 1:
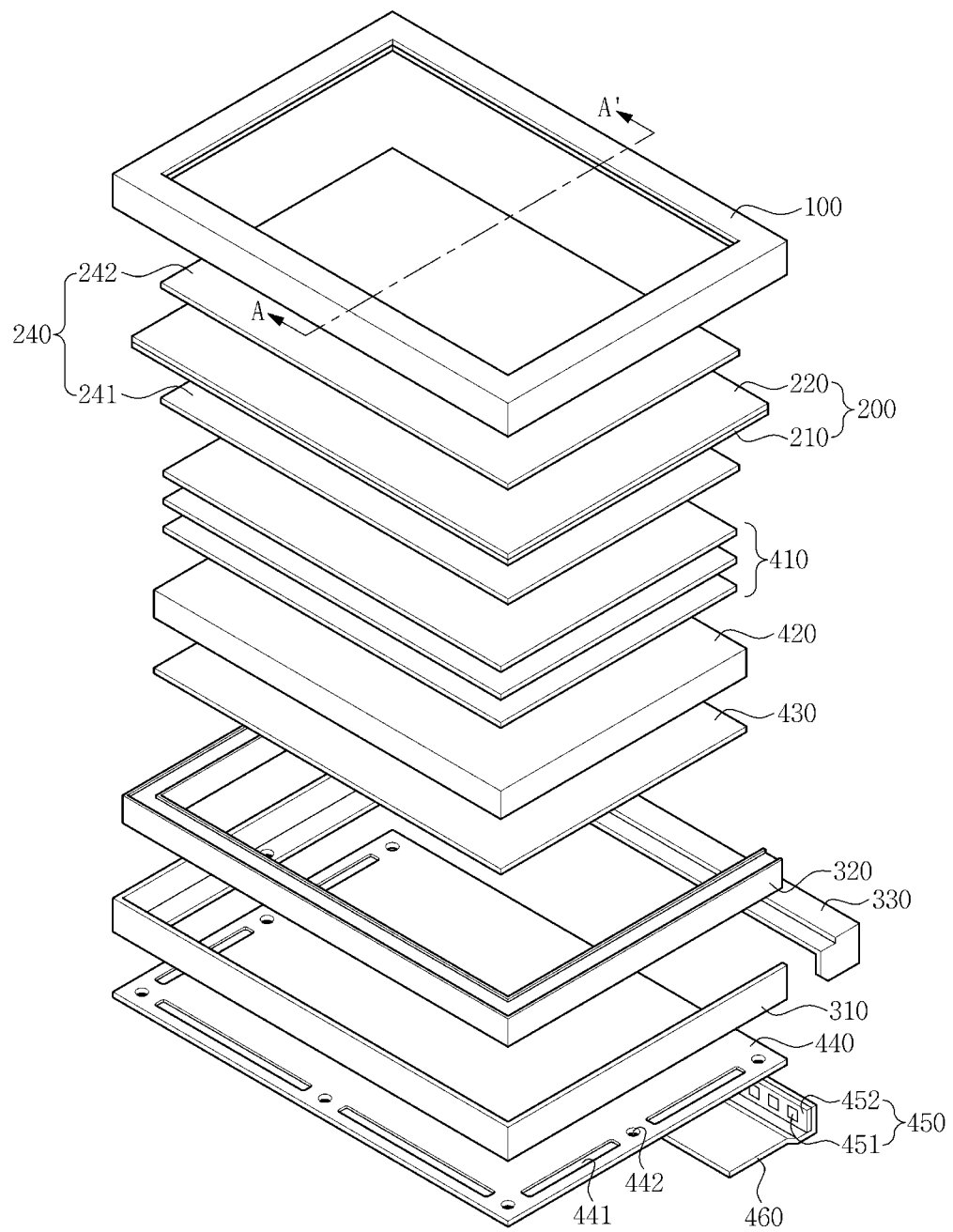
FIG. 1 is a schematic exploded perspective view illustrating a display device according to an exemplary embodiment.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, an exemplary embodiment of a display device will be described with reference to FIGS. 1, 2, 3, and 4.

Figure 2:
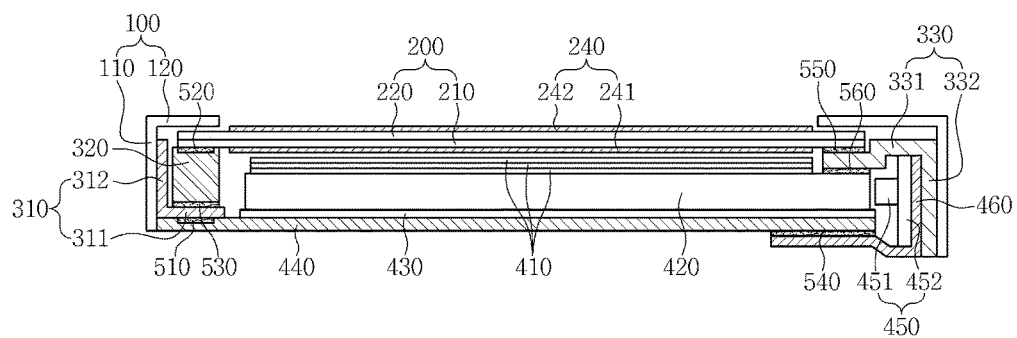
FIG. 2 is a cross-sectional view taken along section line A-A' of FIG. 1.

FIG. 1 is a schematic exploded perspective view illustrating the display device according to an exemplary embodiment. FIG. 2 is a cross-sectional view taken along section line A-A' of FIG. 1.

Referring to FIGS. 1 and 2, an exemplary embodiment of the display device includes a display panel 200 that displays an image, a backlight assembly 400 that provides light to the display panel 200, an upper frame 100 that surrounds the display panel 200, a first intermediate frame 310 on which the display panel 200 is disposed or mounted, a second intermediate frame 320, and a third intermediate frame 330.

In such an embodiment, the upper frame 100 covers an edge of the display panel 200. The upper frame 100 may be coupled to the first intermediate frame 310 or a lower frame 440. The upper frame 100 may include an edge portion 110 coupled to the first intermediate frame 310 or the lower frame 440, and a protruding portion 120 bent from the edge portion 110 to extend therefrom. The edge of the display panel 200 covered by the upper frame 100 may be a non-display area. An opening, through which the display panel 200 is exposed, is defined in a center portion of the upper frame 100. In an alternative exemplary embodiment, the upper frame 100 may be omitted to achieve slimness and lightweight of the display device.

The display panel 200 is configured to display images. The display panel 200 that is a light-receiving type (or non-emissive-type) display panel may include a liquid crystal display ("LCD") panel, an electrowetting display panel, an electrophoretic display ("EPD") panel, a microelectromechanical system ("MEMS") display panel, or the like. Hereinafter, an exemplary embodiment where the display panel 200 includes an LCD panel will be described in detail, for convenience of description, but the invention is not limited thereto.

The display panel 200 may be in a quadrangular planar shape having two pairs of parallel sides. According to an exemplary embodiment, as shown in FIG. 1, the display panel 200 may have a rectangular shape having a pair of relatively long sides and a pair of relatively short sides. The display panel 200 includes a first substrate (or an upper panel) 210, a second substrate (or a lower panel) 220 opposing the first substrate 210, and a liquid crystal layer (not illustrated) between the first and second substrates 210 and 220. The display panel 200, when viewed from a plan view, includes a display area, in which an image is displayed, and a non-display area, which surrounds the display area and in which an image is not displayed. The non-display area may be covered by the upper frame 100.

In an exemplary embodiment, the first substrate 210 may include a plurality of pixel electrodes (not illustrated) and a plurality of thin film transistors (not illustrated) electrically connected to the pixel electrodes in one-to-one correspondence. The thin film transistor includes a source electrode connected to a data line, a gate electrode connected to a gate line, and a drain electrode connected to the pixel electrode. Each of the thin film transistors functions as a switch of a driving signal supplied to a corresponding one of the pixel electrodes. In such an embodiment, the second substrate 220 may include a common electrode (not illustrated) that generates an electric field, which controls an alignment of liquid crystals, along with the pixel electrodes. The display panel 200 is configured to drive the liquid crystal layer to thereby display an image frontwards.

In an exemplary embodiment, the display panel 200 may include a driving chip (not illustrated) configured to supply a driving signal, a driving-chip mounting film (not illustrated) on which the driving chip is mounted, and a printed circuit board ("PCB", not illustrated) electrically connected to the display panel 200 through the driving-chip mounting film. The driving-chip mounting film may be a tape carrier package ("TCP").

The driving chip generates a driving signal for driving the display panel 200 in response to an external signal applied thereto. The external signal is supplied from the PCB, and may include an image signal, various control signals, a driving voltage, and the like, for example.

In an exemplary embodiment, a polarizer 240 is disposed on the display panel 200, and includes a first polarizer 241 and a second polarizer 242. The first and second polarizers 241 and 242 are disposed on respective surfaces of the first substrate 210 and the second substrate 220 that are opposite to respective surfaces of the first substrate 210 and the second substrate 220 opposing one another. In such an embodiment, the first polarizer 241 may be attached to an outer surface of the first substrate 210, and the second polarizer 242 may be attached to an outer surface of the second substrate 220. A transmissive axis of the first polarizer 241 is substantially perpendicular with respect to a transmissive axis of the second polarizer 242.

The first intermediate frame 310, the second intermediate frame 320 and the third intermediate frame 330 accommodate the display panel 200. The first intermediate frame 310, the second intermediate frame 320 and the third intermediate frame 330 may include or be formed of a flexible material, such as plastics, to reduce or effectively prevent damage to the display panel 200.

The first intermediate frame 310, the second intermediate frame 320 and the third intermediate frame 330 are disposed along an edge of the display panel 200. The second intermediate frame 320 and the third intermediate frame 330 support the display panel 200 from therebelow.

The first intermediate frame 310, the second intermediate frame 320 and the third intermediate frame 330 may be disposed to correspond to four sides or at least one of the four sides of the display panel 200. In one exemplary embodiment, for example, the first intermediate frame 310 and the second intermediate frame 320 may have a quadrilateral-loop shape corresponding to the four sides of the display panel 200. The third intermediate frame 330 may have a "[" shape, that is, a quadrilateral-open-loop shape corresponding to three of the four sides of the display panel 200.

In such an embodiment, the backlight assembly 400 may include an optical sheet 410, a light guide plate 420, a reflective sheet 430, the lower frame 440, a light source unit 450, and a fixing frame 460.

The light source unit 450 may include a light source 451 and a circuit board 452 on which the light source 451 is disposed. The light source unit 450 may be disposed at an edge or a light-incident side surface of the light guide plate 420. In such an embodiment, the light source unit 450 may emit light to the edge or the light-incident side surface of the light guide plate 420.

The light source 451 may include a light emitting diode ("LED") chip (not illustrated) or a package that accommodates the LED chip. The light source 451 may include a light-emitting surface toward the light guide plate 420. The light emitted from the light source 451 may be a blue light.

The circuit board 452 may include, for example, a PCB or a metal printed circuit board ("MPCB").

The light source unit 450 may be disposed on one, two or four side surfaces of the light guide plate 420 based on a size, luminance uniformity, and the like, of the display panel 200. According to an alternative exemplary embodiment, the light source unit 450 may be disposed on at least one of the edges of the light guide plate 420.

The light guide plate 420 receives the light emitted from the light source 451 incident on the light-incident side surface of the light guide plate 420, and outputs the light toward a light-dissipating surface of the light guide plate 420. The light guide plate 420 is configured to uniformly supply, to the display panel 200, the light supplied from the light source unit 450. The light guide plate 420 is disposed adjacent to the light source unit 450 and is accommodated in the lower frame 440. The light guide plate 420 may be, for example, in a quadrangular planar shape, similarly to the display panel 200, but the shape of the light guide plate 420 is not limited thereto. According to an alternative exemplary embodiment, in which the light source 451 includes an LED, the light guide plate 420 may have various shapes such as, for example, a predetermined groove and/or a protrusion, based on a position of the light source 451.

In an exemplary embodiment, as described above, the light guide plate 420 may have a planar shape, that is, a plate, but not being limited thereto. According to an alternative exemplary embodiment, the light guide plate 420 may be in a sheet or film shape to achieve slimness of the display device. The light guide plate 420 is to be understood as having a concept that includes not only a plate but also a film for guiding light.

The light guide plate 420 may include a light-transmissive material. The light-transmissive material may include polycarbonate ("PC"), or an acrylic resin such as polymethyl methacrylate ("PMMA") such that light is efficiently guided.

A pattern may be defined or formed on at least a surface of the light guide plate 420. In one exemplary embodiment, for example, a scattering pattern (not illustrated) may be defined on a surface of the light guide plate 420 to allow light guided to a lower surface of the light guide plate 420 to be emitted upwardly thereof.

The optical sheet 410 may be disposed on the light guide plate 420 and diffuses or collimates light transmitted from the light guide plate 420. The optical sheet 410 may be collectively defined by a diffusion sheet, a prism sheet, a protective sheet, and the like.

The diffusion sheet may disperse light incident from the light guide plate 420 to thereby prevent the light from being partially concentrated.

The prism sheet may include, on a surface thereof, prisms having a triangular cross-section and disposed in a predetermined pattern or arrangement. The prism sheet may be disposed on the diffusion sheet to collimate light diffused from the diffusion sheet in a direction perpendicular with respect to the display panel 200.

The protective sheet may be disposed on the prism sheet, may protect a surface of the prism sheet, and may diffuse light to achieve uniform light distribution.

The reflective sheet 430 may be interposed between the light guide plate 420 and the lower frame 440, and reflect light that is emitted downwardly from the light guide plate 420 to allow the light to be directed toward the display panel 200, thereby improving light efficiency.

The reflective sheet 430 may include or be formed of, for example, polyethylene terephthalate ("PET"), thus having high reflectivity. A surface of the reflective sheet 430 may be coated with a diffusion layer including, for example, titanium dioxide ($TiO_2$).

According to alternative exemplary embodiments, the reflective sheet 430 may include or be formed of a material including a metal, such as silver (Ag).

In an exemplary embodiment, the lower frame 440 accommodates the reflective sheet 430 and the light guide plate 420. The lower frame 440 may have a quadrangular planar shape. The lower frame 440 may include or be formed of a metal having relatively high rigidity such as stainless steel, or a material having a relatively high heat dissipation property such as aluminum (Al) or an Al alloy. In such an embodiment, the lower frame 440 maintains a framework of the display device, and protects various components accommodated therein.

The fixing frame 460 is disposed at a position corresponding to a side of the display panel 200. The fixing frame 460 includes the light source unit 450 disposed thereon, reduces or effectively prevents the leakage of the light emitted from the light source unit 450, and dissipates heat from the light source unit 450.

The structures of the lower frame 440, the first intermediate frame 310, the second intermediate frame 320, the third intermediate frame 330, and the fixing frame 460 will hereinafter be described in greater detail with reference to FIGS. 2, 3 and 4.

Figure 3:
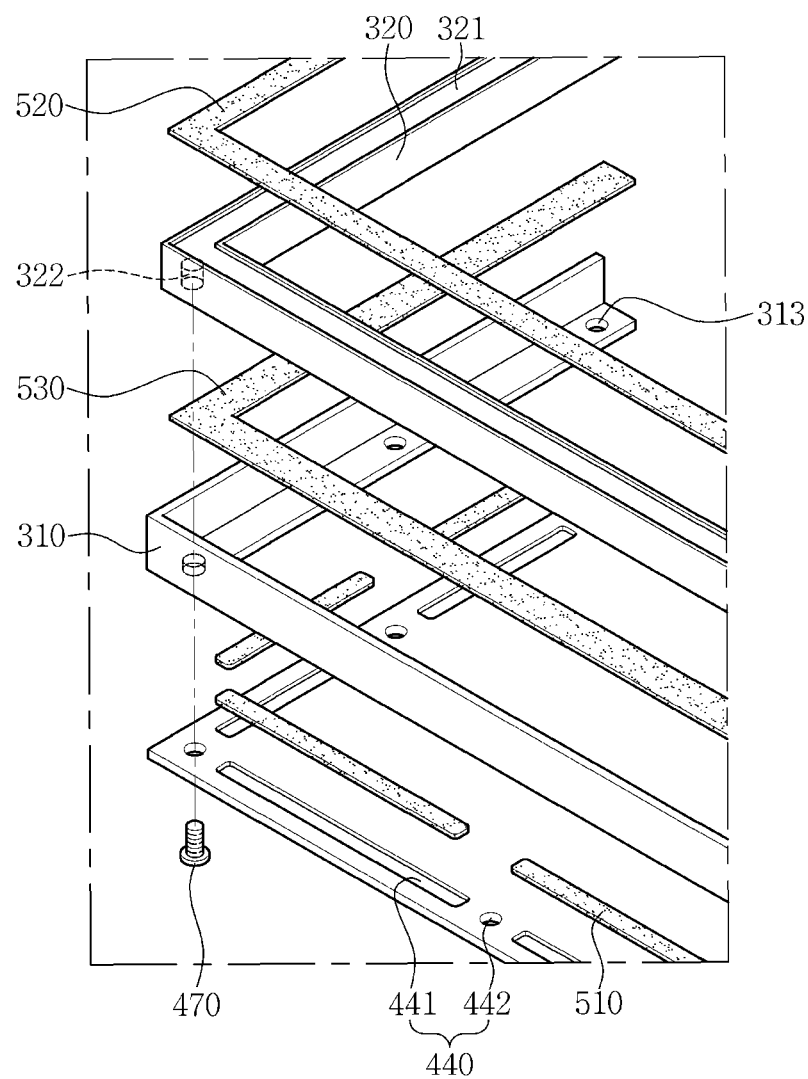
FIG. 3 is a schematic exploded perspective view illustrating a lower frame, a first intermediate frame, and a second intermediate frame shown in FIG. 1.

FIG. 3 is a schematic exploded perspective view illustrating the lower frame 440, the first intermediate frame 310, and the second intermediate frame 320 shown in FIG. 1. FIG. 4 is a schematic exploded perspective view illustrating the light source unit 450, the fixing frame 460, and the third intermediate frame 330 shown in FIG. 1.

Figure 4:
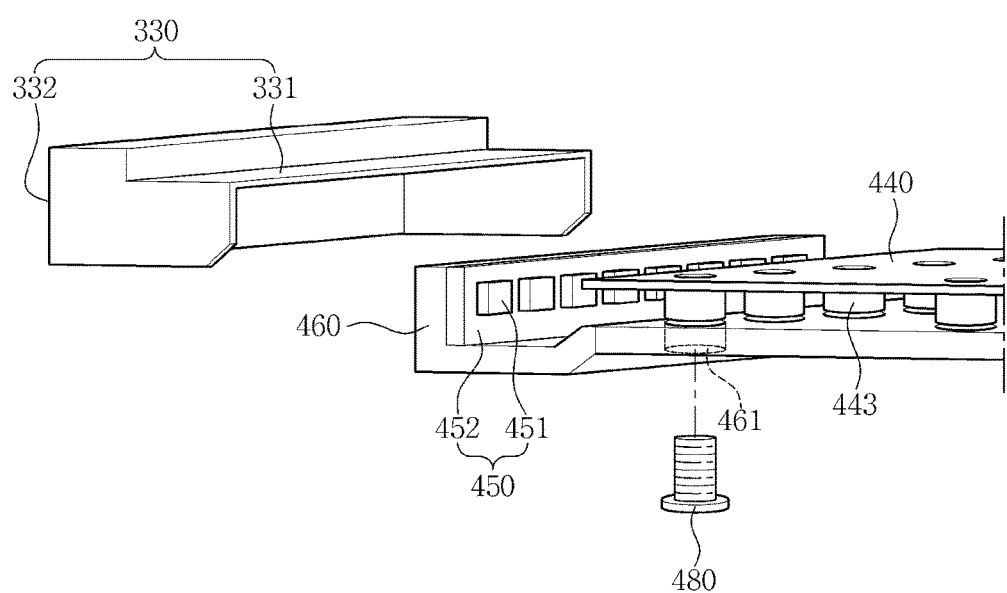
FIG. 4 is a schematic exploded perspective view illustrating a light source unit, a fixing frame, and a third intermediate frame shown in FIG. 1.

Referring to FIGS. 2, 3 and 4, in an exemplary embodiment, the lower frame 440 has a planar shape, and a first groove 441, a third coupling hole 442 and a fourth coupling hole 443 are defined in or on an edge of the lower frame 440. The first groove 441 and the third coupling hole 442 may be defined on or in a portion of the lower frame 440 corresponding to or overlapping the first intermediate frame 310. The fourth coupling hole 443 may be defined in a portion of the lower frame 440 that is coupled to the fixing frame 460. In one exemplary embodiment, for example, screws may be inserted into the third coupling hole 442 and the fourth coupling hole 443.

The first intermediate frame 310 is coupled to the lower frame 440 to define an accommodating space. In an exemplary embodiment, as shown in FIG. 2, the first intermediate frame 310 includes a base portion 311 and a side wall portion 312. The base portion 311 is coupled to the lower frame 440, and the side wall portion 312 extends from the base portion 311 to be disposed on an edge of the lower frame 440. The side wall portion 312 defines the accommodating space with the lower frame 440, in lieu of a side wall of a conventional lower frame. A first coupling hole 313 is defined in the first intermediate frame 310 at a position corresponding to the third coupling hole 442 of the lower frame 440.

A first adhesive member 510 is disposed in the first groove 441 of the lower frame 440 to fix the first intermediate frame 310 to the lower frame 440. The first adhesive member 510 may be a liquid adhesive or a double-sided tape, for example.

The second intermediate frame 320 is disposed on the first intermediate frame 310. The display panel 200 is disposed or mounted on an upper surface of the second intermediate frame 320. The second intermediate frame 320 supports the display panel 200 and defines a position of the display panel 200 in the accommodating space. A second groove 321 is defined on the upper surface of the second intermediate frame 320. The second intermediate frame 320 is disposed between the side wall portion 312 of the first intermediate frame 310 and the light guide plate 420 disposed in the accommodating space. A second coupling hole 322 is defined in the second intermediate frame 320 at a position corresponding to the third coupling hole 442 and the first coupling hole 313.

A second adhesive member 520 is disposed on the upper surface of the second intermediate frame 320 to fix the display panel 200 to the second intermediate frame 320. The second adhesive member 520 may be disposed in the second groove 321 of the second intermediate frame 320. The second adhesive member 520 may be a liquid adhesive or a double-sided tape, for example. The display panel 200 may be effectively or stably fixed to the second intermediate frame 320 by the second adhesive member 520.

A fastening member 470 is disposed through the third coupling hole 442, the first coupling hole 313 and the second coupling hole 322 to couple the lower frame 440, the first intermediate frame 310 and the second intermediate frame 320 to one another. The fastening member 470 may be a screw, for example.

In an exemplary embodiment, the number of the fastening members 470, and the first, second and third coupling holes 313, 322 and 442 may be determined based on the strength and fastening force of the display device.

A third adhesive member 530 is disposed between the first intermediate frame 310 and the second intermediate frame 320 to couple the first intermediate frame 310 and the second intermediate frame 320 to one another. An aperture (not illustrated) may be defined in the third adhesive member 530 at a position corresponding to the third coupling hole 442. According to an alternative exemplary embodiment, the third adhesive member 530 may be omitted, and the first intermediate frame 310 and the second intermediate frame 320 may be coupled to one another by the fastening member 470.

The fixing frame 460 is disposed at a side of the lower frame 440, and defines the accommodating space, along with the first intermediate frame 310. As illustrated in FIG. 1, the fixing frame 460 is disposed at a side of the lower frame 440 on which the first intermediate frame 310 is absent, and is coupled to the lower frame 440. Accordingly, the first intermediate frame 310 and the fixing frame 460 serve the same function as that of a side wall of a conventional lower frame, and surround the optical sheet 410, the light guide plate 420 and the reflective sheet 430. The light source unit 450 is disposed on the fixing frame 460. In such an embodiment, the light source unit 450 is disposed between the fixing frame 460 and the light guide plate 420. A fifth coupling hole 461 is defined in the fixing frame 460 at a position corresponding to the fourth coupling hole 443 of the lower frame 440.

In an exemplary embodiment, the fixing frame 460 may include or be formed of a material having a high heat dissipation property such as aluminum (Al) or an Al alloy. Accordingly, the fixing frame 460 may effectively dissipate heat generated from the light source unit 450.

A fastening member 480 is disposed through the fourth coupling hole 443 and the fifth coupling hole 461 to couple the lower frame 440 and the fixing frame 460 to one another. The fastening member 480 may be a screw, for example.

In an exemplary embodiment, a fourth adhesive member 540 is disposed between the fixing frame 460 and the lower frame 440 to bond the fixing frame 460 to the lower frame 440. An aperture (not illustrated) may be defined in the fourth adhesive member 540 at a position corresponding to the fourth coupling hole 443. According to an alternative exemplary embodiment, the fourth adhesive member 540 may be omitted, and the fixing frame 460 and the lower frame 440 may be coupled to one another by the fastening member 480.

The third intermediate frame 330 covers the light source unit 450 and an upper surface of the fixing frame 460, and is coupled to the fixing frame 460. The third intermediate frame 330 is disposed at a position in the display device corresponding to a side of the display panel 200, on which the first intermediate frame 310 and the second intermediate frame 320 are absent. The third intermediate frame 330 supports the display panel 200, in a manner similar to that of the second intermediate frame 320. In such an embodiment, a portion of the third intermediate frame 330 is disposed between the light guide plate 420 and the display panel 200 to thereby maintain the position of the light guide plate 420 in the accommodating space. In an exemplary embodiment, the third intermediate frame 330 may include or be formed of a material having a relatively high heat dissipation property such as aluminum (Al) or an Al alloy. Accordingly, the third intermediate frame 330 may effectively dissipate heat generated from the light guide plate 420 outwards.

The third intermediate frame 330 includes a first mold 331 that covers the light source unit 450 and the upper surface of the fixing frame 460, and a second mold 332 bent from the first mold 331 to cover a side surface of the fixing frame 460. A portion of the first mold 331 is disposed between the light guide plate 420 and the display panel 200.

Hereinafter, the accommodating space on the lower frame 440 in an exemplary embodiment will be described in detail. In an exemplary embodiment, each of the first intermediate frame 310 and the second intermediate frame 320 may be disposed to correspond to three sides of the lower frame 440. In an exemplary embodiment, where the lower frame 440 having a quadrangular planar shape has first to fourth sides, the first intermediate frame 310 and the second intermediate frame 320 may only be disposed at the first to third sides of the lower frame 440. In such an embodiment, the fixing frame 460 and the third intermediate frame 330 may be disposed at the fourth side of the lower frame 440. Accordingly, the first intermediate frame 310, the second intermediate frame 320, the fixing frame 460 and the third intermediate frame 330 collectively define the accommodating space on the lower frame 440.

A fifth adhesive member 550 may further be disposed between the display panel 200 and the first mold 331, and a sixth adhesive member 560 may further be disposed between the light guide plate 420 and the first mold 331.

The first, second, third, fourth, fifth and sixth adhesive members 510, 520, 530, 540, 550 and 560 may include or be formed of a light shielding material. Accordingly, the first, second, third, fourth, fifth and sixth adhesive members 510, 520, 530, 540, 550 and 560 may prevent the leakage of light from the backlight assembly 400.

In an exemplary embodiment, where the lower frame 440, the first, second and third intermediate frames 310, 320 and 330, and the fixing frame 460 are configured in the above-described manner, the assembly process thereof may be simplified. In a conventional display device, a mold frame is generally inserted into a lower frame having a complex shape. In an exemplary embodiment, the first, second and third intermediate frames 310, 320 and 330, and the fixing frame 460 may be vertically coupled to the lower frame 440 which has a planar shape in a relatively simple manner. In one exemplary embodiment, for example, the first adhesive member 510 is disposed in the first groove 441 of the lower frame 440, and the first intermediate frame 310 is bonded to an edge of the lower frame 440, the second intermediate frame 320 is disposed on the first intermediate frame 310, and then the lower frame 440, the first intermediate frame 310 and the second intermediate frame 320 are coupled to one another using the fastening member 470. The light source unit 450 is fixed to the fixing frame 460, and the fixing frame 460 is coupled to the lower frame 440 from below the lower frame 440. The reflective sheet 430, the light guide plate 420 and the optical sheet 410 are sequentially disposed on the lower frame 440, and the third intermediate frame 330 is coupled to the fixing frame 460. The display panel 200 is disposed on the second intermediate frame 320 and the third intermediate frame 330. In such an embodiment, as described above, an assembly process may be performed in a relatively simple manner from above the lower frame 440 sequentially and from below the lower frame 440 sequentially, and thus, process efficiency may be enhanced.

Hereinafter, an alternative exemplary embodiment with respect to a display device will be described with reference to FIGS. 5 and 6.

Figure 5:
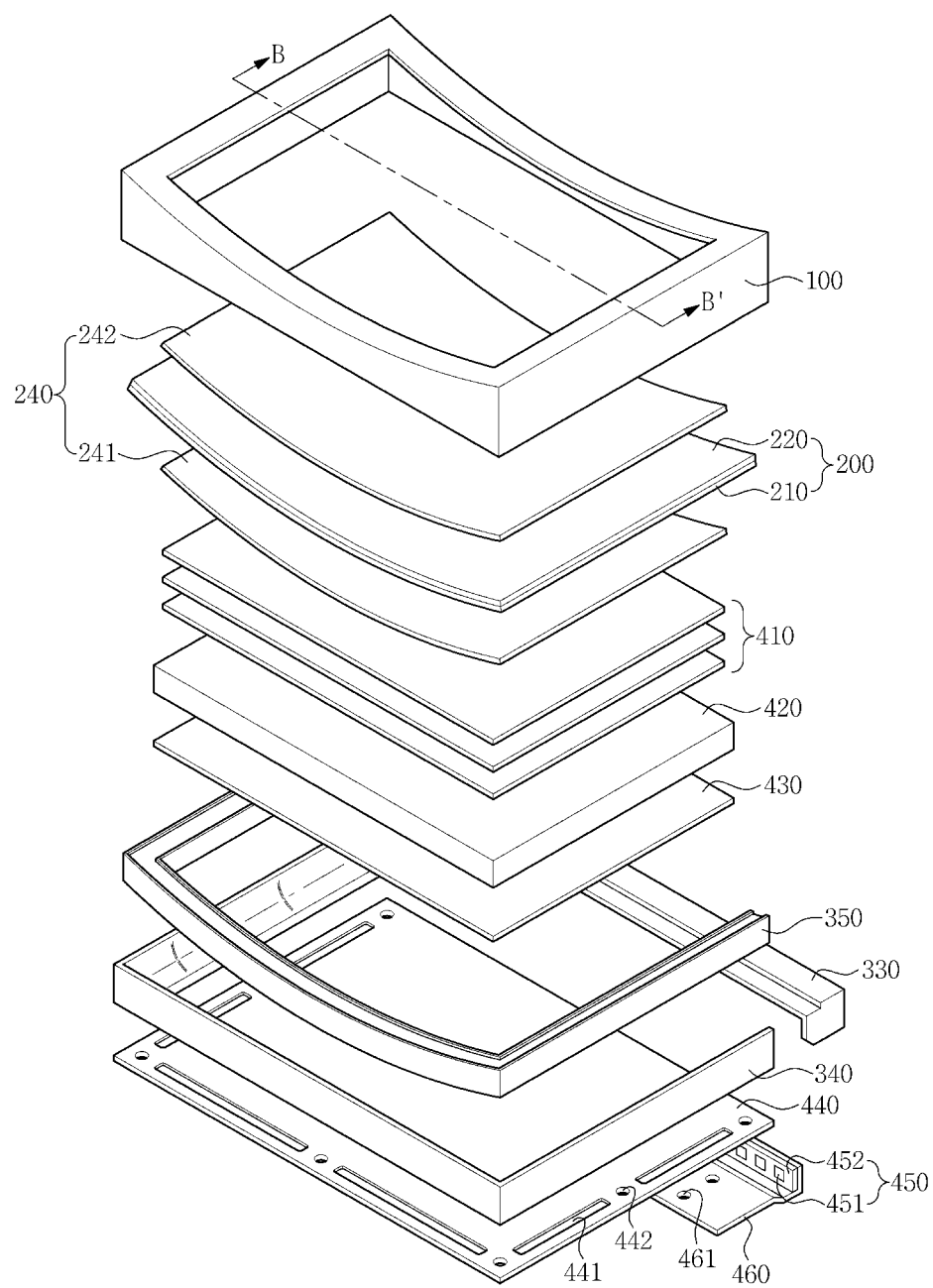
FIG. 5 is a schematic exploded perspective view illustrating a display device according to an alternative exemplary embodiment.

FIG. 5 is a schematic exploded perspective view illustrating the display device according to an alternative exemplary embodiment. FIG. 6 is a cross-sectional view taken along section line B-B' of FIG. 5.

Figure 6:
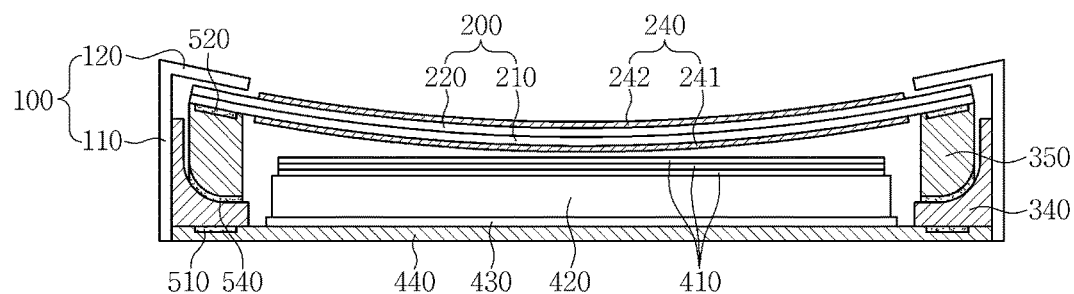
FIG. 6 is a cross-sectional view taken along section line B-B' of FIG. 5.

The display device shown in FIGS. 5 and 6 is substantially the same as the display device shown in FIGS. 1 and 2 except for an upper frame 100, a first intermediate frame 340, a second intermediate frame 350 and a display panel 200. The same or like elements shown in FIGS. 5 and 6 have been labeled with the same reference characters as used above to describe the exemplary embodiments of the display device shown in FIGS. 1 and 2, and any repetitive detailed description thereof will hereinafter be omitted.

Referring to FIGS. 5 and 6, in an exemplary embodiment, a first intermediate frame 340, a second intermediate frame 350 and a display panel 200 have similar curvatures to one another. In such an embodiment, the display panel 200 has a curvature, and the display device is a curved display device. In such an embodiment, the first intermediate frame 340 and the second intermediate frame 350 are manufactured to have curvatures, as shown in FIGS. 5 and 6, and the relatively simple assembly process described above with reference to FIGS. 1 to 4 may be applied to a curved display device.

As set forth above, according to one or more exemplary embodiments, the display device may have a relatively slim thickness and may be manufactured using a relatively simple assembly process.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A display device comprising:
    a lower frame having a planar shape, wherein a first groove is defined in the lower frame;
    a first intermediate frame coupled to the lower frame to define an accommodating space, wherein the first intermediate frame comprises a side wall portion on an edge of the lower frame;
    a first adhesive member on the first groove, wherein the first adhesive member is disposed directly between the first intermediate frame and the lower frame and fixes the first intermediate frame to the lower frame;
    a second intermediate frame on the first intermediate frame;
    a display panel on an upper surface of the second intermediate frame; and
    a second adhesive member on the upper surface of the second intermediate frame, wherein the second adhesive member fixes the display panel to the second intermediate frame.

2. The display device of claim 1, wherein the first adhesive member and the second adhesive member are liquid adhesive.

3. The display device of claim 2, wherein a second groove is defined on the upper surface of the second intermediate frame, and wherein the second adhesive member is disposed in the second groove.

4. The display device of claim 1, further comprising:
    a third adhesive member between the first intermediate frame and the second intermediate frame.

5. The display device of claim 1, further comprising:
    a light source unit which provides light to the display panel;
    a light guide plate which guides the light provided from the light source unit to the display panel; and
    a fixing frame at a side of the lower frame, wherein the fixing frame defines the accommodating space, along with the first intermediate frame.

6. The display device of claim 5, wherein the first intermediate frame and the fixing frame surround the light guide plate.

7. The display device of claim 6, wherein the second intermediate frame is between the side wall portion of the first intermediate frame and the light guide plate.

8. The display device of claim 7, wherein the light source unit is between the fixing frame and the light guide plate.

9. The display device of claim 5, further comprising:
    a fourth adhesive member between the fixing frame and the lower frame,
    wherein the fourth adhesive member fixes the fixing frame to the lower frame.

10. The display device of claim 5, further comprising:
    a third intermediate frame which covers the light source and an upper surface of the fixing frame and is coupled to the fixing frame,
    wherein the third intermediate frame comprises:
    a first mold which covers the light source unit and the upper surface of the fixing frame; and
    a second mold bent from the first mold to cover a side surface of the fixing frame.

11. The display device of claim 10, wherein a portion of the first mold is disposed between the light guide plate and the display panel.

12. The display device of claim 11, further comprising:
    a fifth adhesive member between the display panel and the first mold.

13. The display device of claim 1, further comprising:
    a fastening member which fixes the first intermediate frame and the second intermediate frame to the lower frame.

14. The display device of claim 1, wherein at least a portion of the first intermediate frame is disposed between the lower frame and the second intermediate frame.

15. A display device comprising:
    a lower frame having a planar shape, wherein a first groove is defined in the lower frame;
    a first intermediate frame coupled to the lower frame to define an accommodating space, wherein the first intermediate frame comprises a side wall portion on an edge of the lower frame and has a curvature;
    a first adhesive member on the first groove, wherein the first adhesive member is disposed directly between the first intermediate frame and the lower frame and fixes the first intermediate frame to the lower frame;
    a second intermediate frame on the first intermediate frame, wherein the second intermediate frame has a curvature;
    a display panel on an upper surface of the second intermediate frame, wherein the display panel has a curvature; and
    a second adhesive member on the upper surface of the second intermediate frame, wherein the second adhesive member fixes the display panel to the second intermediate frame.

16. The display device of claim 15, wherein the first adhesive member and the second adhesive member are liquid adhesives.

17. The display device of claim 16, wherein
a second groove is defined on the upper surface of the second intermediate frame, and
the second adhesive member is disposed in the second groove.

18. The display device of claim 15, further comprising:
a light source unit which provides light to the display panel;
a light guide plate which guides the light provided from the light source unit to the display panel; and
a fixing frame at a side of the lower frame, wherein the fixing frame defines the accommodating space, along with the first intermediate frame.

19. The display device of claim 18, wherein the first intermediate frame and the fixing frame surround the light guide plate.

20. The display device of claim 19, further comprising:
a third intermediate frame which covers the light source and an upper surface of the fixing frame and is coupled to the fixing frame,
wherein the third intermediate frame comprises:
a first mold which covers the light source unit and the upper surface of the fixing frame; and
a second mold bent from the first mold to cover a side surface of the fixing frame.

* * * * *